US011824580B2

(12) United States Patent
Thommana et al.

(10) Patent No.: US 11,824,580 B2
(45) Date of Patent: Nov. 21, 2023

(54) OPPORTUNISTIC COMMUNICATION WAVEFORM

(71) Applicant: Rockwell Collins, Inc., Cedar Rapids, IA (US)

(72) Inventors: John V. Thommana, Cedar Rapids, IA (US); Syed A. Ahmed, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/728,645

(22) Filed: Apr. 25, 2022

(65) Prior Publication Data

US 2023/0344465 A1     Oct. 26, 2023

(51) Int. Cl.
*H04B 1/715*     (2011.01)
*H04B 1/7156*    (2011.01)
*H04B 17/336*    (2015.01)
*H04B 1/00*      (2006.01)

(52) U.S. Cl.
CPC .......... *H04B 1/715* (2013.01); *H04B 1/0003* (2013.01); *H04B 1/7156* (2013.01); *H04B 17/336* (2015.01); *H04B 2001/7154* (2013.01); *H04B 2001/71563* (2013.01)

(58) Field of Classification Search
CPC .... H04B 1/715; H04B 1/0003; H04B 1/7156; H04B 17/336; H04B 2001/7154; H04B 2001/71563
See application file for complete search history.

(56) References Cited

U.S. PATENT DOCUMENTS

| | | | |
|---|---|---|---|
| 7,103,316 B1* | 9/2006 | Hall | H04B 17/318 455/226.2 |
| 9,455,763 B2 | 9/2016 | Muqaibel et al. | |
| 10,228,449 B2 | 3/2019 | Nguyen et al. | |
| 10,264,407 B2 | 4/2019 | Hu et al. | |
| 10,651,955 B2 | 5/2020 | Scaglione et al. | |
| 11,194,005 B2 | 12/2021 | Reisenfeld et al. | |
| 2014/0274093 A1* | 9/2014 | Abdelmonem | H04W 4/02 455/450 |
| 2020/0389205 A1* | 12/2020 | Gresset | H04B 1/715 |

OTHER PUBLICATIONS

Arjoune, Youness et al., "Compressive Sensing: Performance Comparison of Sparse Recovery Algorithms", Electrical Engineering Department, University of North Dakota, Grand Forks, USA, Musics Department, INPT, Rabat, Morocco, Downloaded Mar. 7, 2022, 7 pages.

(Continued)

*Primary Examiner* — Sam K Ahn
*Assistant Examiner* — Amneet Singh
(74) *Attorney, Agent, or Firm* — Suiter Swantz pc llo

(57) ABSTRACT

A communication system is described. The communication system includes a number of nodes which frequency hop without coordination from a frequency table. To establish communication, the nodes scan across a band for one or more signals of interest. The signals of interest include one or more of a synchronization signal, a control signal, and a traffic signal. When transmitting the signals of interest, the nodes determine one or more characteristic for the signal, such as a channel, based on a spectral occupancy of interferers in the band.

20 Claims, 14 Drawing Sheets

(56) References Cited

OTHER PUBLICATIONS

Chen, Scott Shaobing et al., "Atomic Decomposition by Basis Pursuit", Siam Review, vol. 43, No. 1, Downloaded Mar. 7, 2022, pp. 129-159.
Csiszar, I. et al., "Information Geometry and Alternating Minimization Procedures", GLESER, Statistics & Decisions, Supplemental Issue No. 1,pp. 205-237, (1984), Revised version.
L. Zhao, et al., "Blind Frequency Hopping Spectrum Estimation: A Bayesian Approach," 2014 IEEE Fourth International Conference on Big Data and Cloud Computing, 2014, pp. 669-675, doi: 10.1109/BDCloud.2014.137.

* cited by examiner

OPPORTUNISTIC COMMUNICATION WAVEFORM

TECHNICAL FIELD

The present invention generally relates to communications, and more specifically to opportunistic real-time frequency hopping communications.

BACKGROUND

Dynamic Spectrum Access (DSA) is a spectrum sharing paradigm that allows secondary users to access unused spectrum in a frequency band licensed to primary users. A typical secondary user may utilize a spectrum harvester to scan a frequency band to look for unused spectrum. The secondary user may then use the harvested (unused) spectrum opportunistically on a non-interfering basis.

A challenge in tactical networking with dynamic spectrum access (DSA) is ensuring that all the members in the network are synchronized in time, and "frequencies in use". As the network size increases, the overheads required to ensure that all the members of the group are synchronized in time and "frequencies in use" increases exponentially. In addition, more overheads are needed to prevent nodes from dropping off the network and to permit rejoining the network. The dynamic spectrum access may be performed according to rules of operation in the band, such as maximum signal power, bandwidth of operation, communication range, and who can operate in the band. These constraints ensure that the signal-to-interference-plus noise ratio (SINR) in the band is constrained.

In order to support real-time frequency hopping all nodes in the network have to be synchronized in time and frequency usage. Typically, the nodes use a common frequency table with 100 or more frequency entries and the frequency is picked pseudo randomly for every communication opportunity. This technique works only if all nodes in the network are time synchronized. The common technique of time synchronization is to send synchronization bursts at predetermined times based on GPS or wrist-watch time. Nodes with time uncertainty have to look for the presence of the desired signal within a time window that accounts for positive and negative time uncertainty for future synchronization bursts and reception of consecutive synchronization bursts ensures time synchronization. Therefore, it would be advantageous to provide a device, system, and method that cures the shortcomings described above.

SUMMARY

A frequency-hopped dynamic-spectrum-access operational technique is described.

A software defined radio is described, in accordance with one or more embodiments of the present disclosure. In one illustrative embodiment, the software defined radio includes a non-transitory memory maintaining program instructions. In another illustrative embodiment, the software defined radio includes one or more processors configured to execute the program instructions maintained on the memory. In another illustrative embodiment, the program instructions cause the one or more processors to scan an operational band including a plurality of channels to determine an interference-plus-noise ratio for each of the plurality of channels based on one or more interferers in the plurality of channels. In another illustrative embodiment, the program instructions cause the one or more processors to transmit, without frequency synchronization to a frequency table, a signal in at least one channel while frequency hopping the at least one channel between the plurality of channels to avoid the one or more interferers. In another illustrative embodiment, the program instructions cause the one or more processors to receive one or more sub-bands of the operational band, at least one of the one or more sub-bands including the signal, the one or more sub-bands each including a bandwidth greater than a channel bandwidth. In another illustrative embodiment, the program instructions cause the one or more processors to detect the signal by scanning each channel of the one or more sub-bands of the operational band using a sparse detection algorithm with one or more constraints and without a priori knowledge of the at least one channel in which the signal is transmitted; wherein the one or more constraints include the channel bandwidth and a robustness of the signal.

A communication system is described, in accordance with one or more embodiments of the present disclosure. In one illustrative embodiment, the communication system includes a plurality of nodes. In another illustrative embodiment, the plurality of nodes includes at least one transmitter node including a first software defined radio. In another illustrative embodiment, the first software defined radio is configured to scan an operational band including a plurality of channels to determine an interference-plus-noise ratio for each of the plurality of channels based on one or more interferers in the plurality of channels. In another illustrative embodiment, the first software defined radio is configured to transmit, without frequency synchronization to a frequency table, a signal in at least one channel while frequency hopping the at least one channel between the plurality of channels to avoid the one or more interferers. In another illustrative embodiment the plurality of nodes includes at least one receiver node including a second software defined radio. In another illustrative embodiment, the second software defined radio is configured to receive one or more sub-bands of the operational band, at least one of the one or more sub-bands including the signal, the one or more sub-bands including a bandwidth greater than a channel bandwidth. In another illustrative embodiment, the second software defined radio is configured to detect the signal by scanning each channel of the one or more sub-bands using a sparse detection algorithm with one or more constraints and without a priori knowledge of the at least one channel in which the signal is transmitted; wherein the one or more constraints include the channel bandwidth and a number of symbols of the signal. In another illustrative embodiment, the at least one transmitter node and the at least one receiver node are uncoordinated without time synchronization or frequency synchronization at initialization. In another illustrative embodiment, the at least one receiver node becomes time synchronized with the at least one transmitter node upon detecting the signal; wherein the at least one receiver node is not frequency synchronized with the at least one transmitter node after detecting the signal.

A method is described, in accordance with one or more embodiments of the present disclosure. In one illustrative embodiment, the method includes scanning an operational band including a plurality of channels to determine an interference-plus-noise ratio for each of the plurality of channels based on one or more interferers in the plurality of channels by at least one transmitter node. In another illustrative embodiment, the method includes transmitting, without frequency synchronization to a frequency table, a signal in at least one channel while frequency hopping the at least one channel between the plurality of channels to avoid the one or more interferers by the at least one transmitter node. In another illustrative embodiment, the method includes receiving one or more sub-bands of the operational band by at least one receiver node, wherein at least one of the one or more sub-bands including the signal, the one or more sub-bands each including a bandwidth greater than a channel bandwidth. In another illustrative embodiment, the method includes detecting, by the at least one receiver node, the signal by scanning each channel of the one or more sub-bands of the operational band using a sparse detection algorithm with one or more constraints and without a priori knowledge of the at least one channel in which the signal is transmitted; wherein the one or more constraints include the channel bandwidth and a number of symbols of the signal.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
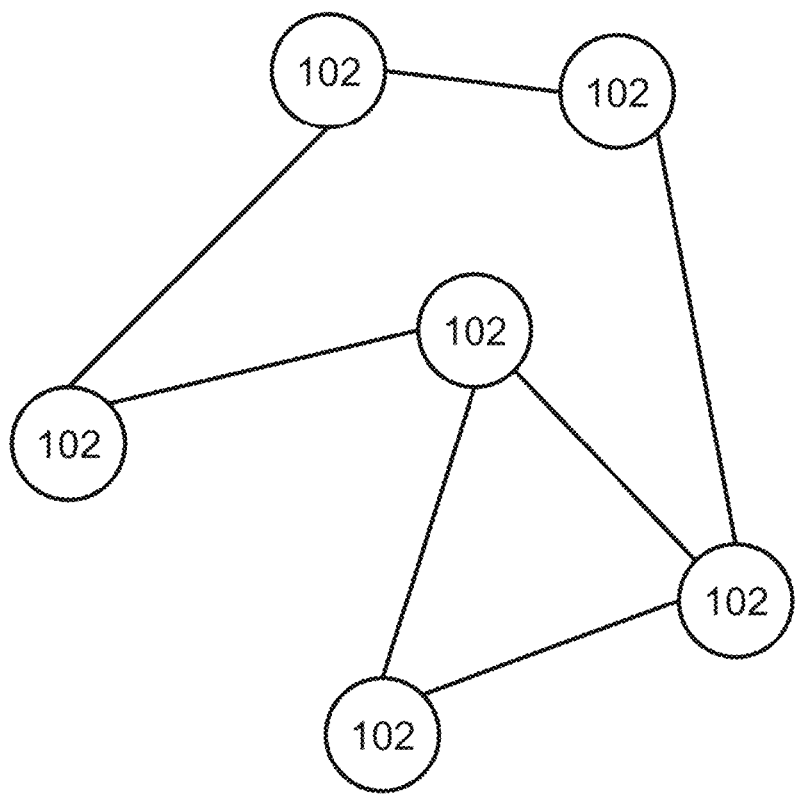
FIG. 1 depicts a diagram of a communication system including a network of nodes, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Described herein is an opportunistic communication networking waveform, which may also be referred to herein as an opportunistic communication waveform, a low overhead tactical waveform, a waveform, and the like. The waveform may be used to form a network between nodes. The waveform may scale with network size increases and operate using white/grey frequency space in an opportunistic manner. The network may include a node (transmitter) which transmits in one or more white/grey spaces without informing the other nodes (receivers) in a contested and congested tactical environment. The transmitter may put a signal of interest within one or more frequency bands without informing the receiver. There may be other interferers in the frequency band(s) over which the transmitter and receiver have no control. The transmitter may scan the frequency band, compute an INR for the entire band and sub-bands of the frequency band, and order them based on the INR values. The transmitter may then select one or more sub-bands for transmitting the signal and select one or more signal characteristics for the signal. The one or more sub-bands may be selected based on a number of mission needs. The signal characteristics may be based on the INR of the one or more selected sub-bands for increasing a likelihood of reliable detection. The receiver then determines where the transmitter put the signal of interest, without prior knowledge or frequency synchronization from a frequency table. The receiver may use a compressive sensing technique, such as a sparse detection algorithm, to detect a sparse signal in one or more channels of the band. In embodiments, a Basis Pursuit algorithm is used for to detect the signal. A group of nodes can then form the network and communicate among themselves opportunistically by frequency hopped tactical communications, without requiring a shared frequency table.

Figure 2:
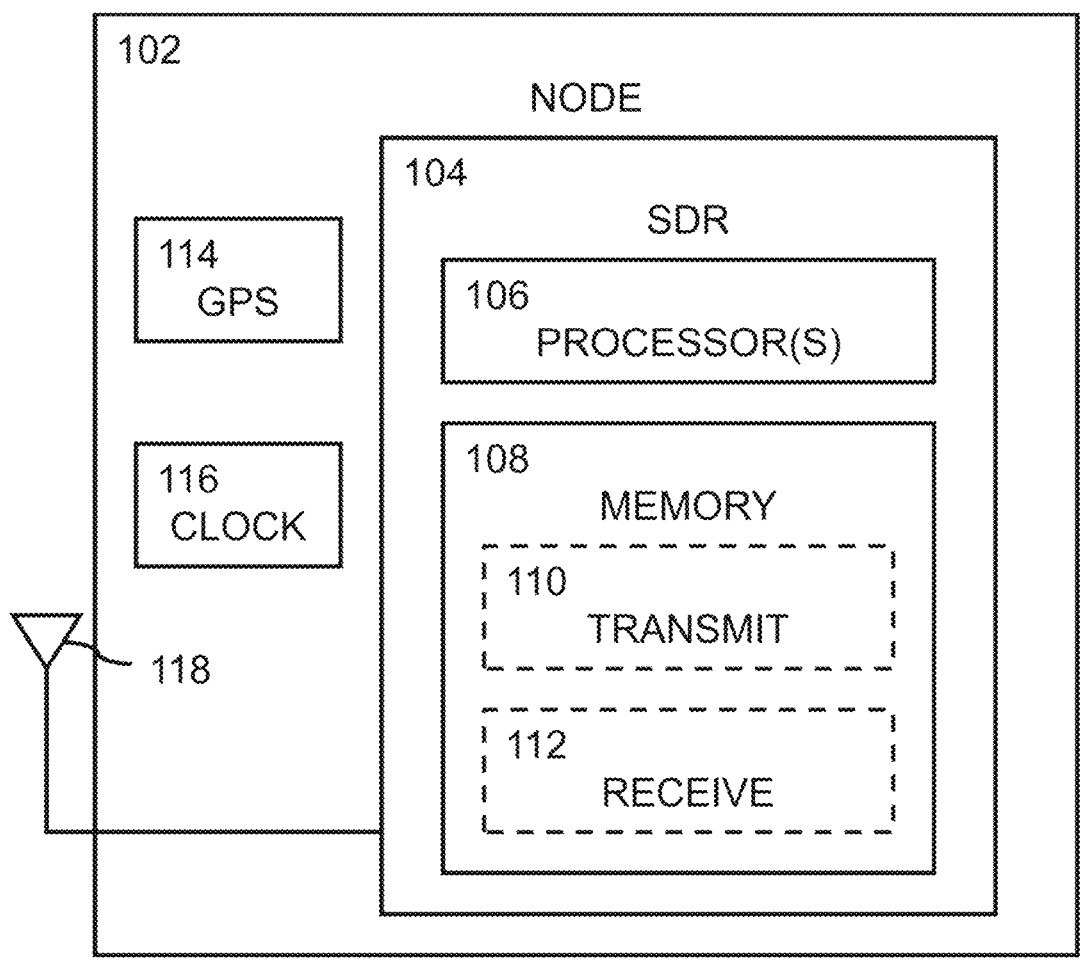
FIG. 2 depicts a simplified schematic of a node of a communication system including a software defined radio configured to execute transmit and receive modules, in accordance with one or more embodiments of the present disclosure.

Referring generally to FIGS. 1 and 2. FIG. 1 depicts a simplified schematic of a communication system configured in accordance with the concepts described herein. FIG. 2 depicts simplified block diagram of nodes 102 of the communication system 100. The nodes 102 may dynamically access spectrum in a tactical communication environment without a frequency table for establishing and maintaining communication between the nodes 102 for establishing the communication system 100 (also referred to as a network, or a mobile ad-hoc network MANET)). The nodes 102 may also be referred to herein as a transmitter node and/or a transmitter when the node is transmitting. The nodes 102 may also be referred herein as a receiver node and/or a receiver when the node is receiving. Where the node 102 is described as being a transmitter node or a transmitter, the node 102 may be understood to include a software defined radio 104 with a transmit module 110 which causes the node to transmit a signal by one or more antenna 118. Where the node 102 is described as being a receiver node or a receiver, the node 102 may be understood to include a software defined radio 104 with a receive module 112 which causes the node to receive a signal by one or more antenna 118. As may be understood, the node 102 may be configured as one of or both a transmitter and receiver, such the recitation of transmitter, transmitter node, receiver node, and receiver is not intended to be limiting.

Each node 102 may include a software defined radio 104. The software defined radio may include one or more processors 106 and a memory 108. The memory 108 may include a non-transitory memory which maintains program instructions for executing one or more modules or functions, such as, but not limited to, a transmit module 110 and a receive module 112. The processors 106 may be configured to execute the program instructions for performing any of the methods described herein. For example, the transmit module 110 may be configured to scan a spectral band, also referred to herein as an operational band, including a plurality of channels to determine an interference-plus-noise ratio for each of the plurality of channels based on one or more interferers in the plurality of channels; transmit, without frequency synchronization to a frequency table, the signal in a channel of the plurality of channels while frequency hopping between the plurality of channels to avoid the one or more interferers. By way of another example, the receive module 112 may be configured to receive the spectral band; and detect the signal by a sparse detection algorithm using one or more constraints without a priori knowledge of the channel in which the signal is transmitted; wherein the one or more constraints include a channel bandwidth and a robustness of the signal. The robustness may indicate a bit rate, a number of symbols of the signal (e.g., for a single carrier communication scheme), a number of subcarriers of the signal (e.g., for a multicarrier communication scheme), and the like.

In some embodiments, the processor 106 is configured to receive the information from a communication interface known in the art. By the communication interface, the processor 106 may be configured to receive information from an antenna 118, or the like. As may be understood, the software defined radio 104 may include any number of components or configurations for implementing the various processes described herein. In some instances, the software defined radio 104 may include, but is not limited to, one or more of the following: a transmitter, transceiver, receiver, processor, information security (INFOSEC), or software stored in a non-transitory computer readable medium, some or all of which may be communicatively coupled. Similarly, the transmitter, transceiver, or receiver may include any components, such as, but not limited to, radio frequency (RF) hardware, converters (e.g., digital-to-analog converter, analog-to-digital converter), front ends, back ends, and the like for inputting or outputting various signals.

In embodiments, the node 102 is configured to achieve time synchronization. Time synchronization can be achieved using timing information received from a navigation satellite system-based time source 114 (e.g., using a Global Positioning System (GPS) receiver). A localized clock 116 may also be utilized to provide additional timing information. The localized clock 116 may also be referred to as wristwatch time which may exhibit time uncertainty from the standardized time received from the GPS. Time synchronization among the nodes 102 may occur by receiving one or more synchronization bursts, as described further herein.

In embodiments, the receive module 112 include one or more sparse detection algorithms. Sparse detection algorithms (also referred to herein as compressive sensing algorithms) using algorithms like Basis Pursuit ("BP") provide a method for sparse signal detection. However, their performance in the environment is constrained by the available SNR and SINR. The SNR can be controlled by the transmitter but the SINR in the band depends on the number of interferers in the band and the level of interference they are injecting into the band. In a tactical operational environment, interferers operating in the environment may not follow given constraints on signal power, bandwidth of operation, communication range, and who can operate in the band, such that the INR in the band may be large. A sparse signal recovery algorithm (e.g., Basis Pursuit) may be used to detect the desired signal of interest that the transmitter arbitrarily put within a wideband spectrum without informing the receivers about where the transmitter transmitted the signal within the constraints imposed by the SNR and SINR. The receiver may then detect the desired signal of interest without a priori knowledge from a frequency table. In some instances, the receiver may be considered a staring receiver which may stare across the band and find the signal of interest.

The transmit module 110 may be configured to select one or more waveform parameters. The one or more waveform parameters may include, but are not limited to, a frequency band, a spectral bandwidth (also referred to herein as an operational bandwidth), a channel size, a robustness, a number of symbols, a number of subcarriers, a network in progress time, a frame start time, a slot start time, a key, a synchronization burst matrix, a traffic burst matrix, a control burst matrix, a constraint matrix, and the like. The signal may be transmitted in one or more bursts, which may include any number of subcarriers, number of symbols, phases, amplitudes, boundary times, burst duration, number of bursts per second, modulation scheme, and the like. The robustness may be determined by the transmitter to achieve reliable detection based on a preconfigured number of sub-bands and burst error rate (i.e., tolerance to loss of bursts or mis-detection). The sub-bands may be preconfigured according to a mission.

The frequency band of interest may be selected. The frequency band of interest may include, but is not limited to the very high frequency (VHF) band, the ultra high frequency (UHF) band, the L band, the S band, the C band, or the like. Multiple bands can also be supported but are not discussed herein for simplicity reasons. Thus, the communication scheme may include, but is not limited to, single-band single-carrier, single-band multi-carrier, multi-band single-carrier, multi-band multi-carrier, and the like.

The operational spectral bandwidth may also be selected. The operational spectral bandwidth may be disposed within the frequency band of interest. For example, the operational spectral bandwidth may include, but is not limited to, 50 MHz, 76.8 MHz, 100 MHz, 1 GHz, and the like, which may be disposed in any of the bands previously described. In some instances, the operational spectral bandwidth may be based on a capability of the software defined radio 104.

A channel bandwidth for a desired signal may also be selected. The channel bandwidth may also be referred to as an instantaneous channel bandwidth. The channel bandwidth may be determined based on dividing the spectral bandwidth. The channel bandwidth may include, but is not limited to, a 25 kHz channel, a 50 kHz channel, a 1.2 MHz channel, a 5 MHz channel and the like, . . . ). For example, 64 channels may be provided for a 76.8 MHz bandwidth, where the channels occupy a 1.2 MHz channel.

The number of symbols may also be selected. The number of symbols may indicate the symbols transmitted at any given time within each of the channels. The number of symbols may also be referred to as a frequency bin, a number of symbols per channel, a sequence of symbols, or a number of symbols per signal. In the context of a multi-carrier waveform the number of symbols can be equated to the number of subcarriers deployed, either contiguously or disaggregated. The number of symbols may include, but is not limited to, 4, 5, 8, 16, 32, 64, any number of symbols therein, or a larger number of symbols. For example, where the total number of channels is 64 and the number of signal symbols per channel is 32, then there may be 2048 symbols in total across the operational spectral bandwidth. Increasing the number of symbols may cause a proportionate decrease in the bit rate of the signal. As may be understood, the number of symbols may be based, at least in part, on the type of modulation scheme by which the signal is transmitted. The modulation scheme may thus include any modulation scheme. The radio may increase the robustness of the signal based on at least one of an interference-plus-noise (INR) ratio or a number of interferers in the channels.

The network in progress time may also be selected. The network in progress time may indicate an amount of time to scan for synchronization bursts before declaring no network is active. The frame start-time and the slot start time for a first frame and a first slot may also be configured. The key may also be selected. The key may be used to compute a synchronization slot identification. The transmission scheme may thus include one or more characteristics of the signal including: a robustness, a number of symbols and/or a number of subcarrier (i.e., affecting the robustness of the signal), a phase, a power, a spectral efficiency, a channel (i.e., signal blending), a signal type, and the like. Where the signal includes subcarriers, the characteristic may also include a relative placement of each of the subcarriers in the channels, such as a contiguous relative placement or a dis-contiguous relative placement.

One or more matrices may also be selected. The matrices may include a synchronization burst matrix. The synchronization burst matrix may be a fast Fourier transformation (FFT) representation of a desired synchronization burst to be transmitted or received. The matrices may also include a traffic burst matrix. Similarly, the traffic burst matrix may be a fast Fourier transformation (FFT) representation of a desired traffic burst. The matrices may also include a control burst matrix. Similarly, the control burst matrix may be a fast Fourier transformation (FFT) representation of a desired control burst. In some instances, the synchronization burst matrix, the traffic burst matrix, and the control burst matrix may also be referred to as an A-matrix or a representative matrix. The synchronization burst matrix, the traffic burst matrix, and the control burst matrix may be the same or different, depending upon an operational need. The A-matrix may indicate one or more characteristics of the signal, such as, but not limited to, a number of symbols, a number of subcarriers, a phase, a power, modulation scheme, and the like. In the example where there are 2048 symbols across the operational spectral bandwidth, each of the synchronization burst matrix, the traffic burst matrix, and the control burst matrix may include a matrix size of 2048 by 2048. The one or more matrices selected may also include a constraint matrix. The constraint matrix may indicate potential locations where synchronization, control, and traffic bursts are anticipated. The constraint matrix may also be referred to as a B-matrix or a description matrix. The constraint matrix may encode a sparsity pattern by imposing constraints on the representative A matrix. The constraint matrix may include constraints on, but is not limited to, a channel start-time, a channel duration, a channel width, a channel boundary, a starting/ending frequency for the operational band, a number of symbols, a number of subcarriers, and the like. In the example where there are 2048 symbols across the operational spectral bandwidth, the constraint matrix may include a matrix size of 64×2048. In some instances, one or more desired signals of interest may be based on the matrices (e.g., a synchronization signal, a control signal, or a traffic signal). The constraint matrix may also be indicative of a set of constraints, which may include, but are not limited to, how the band is channelized, the bandwidth of the frequency bins, a center frequency of the frequency bins, and the like.

In embodiments, the synchronization burst is one of a plurality of synchronization bursts transmitted by the software defined radio 104, for time synchronizing a receiver node. In a single-carrier modulation mode, all symbols may be contiguous such that each synchronization burst are spaced in time and can be placed in any of the free channels by frequency hopping. In a multi-carrier modulation mode, the subcarriers can be contiguous or separated in frequency. The transmitter can also place the synchronization signal (and similarly control burst and traffic bursts) spaced in time, in one or more subcarriers which are contiguous or dis-contiguous.

In embodiments, the transmit module 110 causes the software defined radio 104 to transmit the synchronization bursts, the controls bursts, and the traffic bursts. Each of the synchronization bursts, the controls bursts, and the traffic bursts may be sent in a same frequency band (e.g., UHF band) in a single-carrier and/or multi-carrier modulation scheme. The synchronization bursts, the controls bursts, and the traffic bursts may also be sent in separate frequency bands (e.g., synchronization in a UHF band, control in an L-band, traffic in a S-band, etc.) in a single-carrier and/or multi-carrier modulation scheme. Each type of burst may also be sent in multiple bands to improve robustness. For example, the synchronization burst may be across a first frequency band and a second frequency band. The synchronization burst may also be transmitted in the operational band, with one or more of the control burst or the traffic burst transmitted outside of the operational band.

Each of the transmit module 110 and the receive module 112 may cause the software defined radio 104 to scan the operational spectral bandwidth. The operational spectral bandwidth may be scanned for a number of things, such as, but not limited to, a number of interferers (NF), synchronization bursts, control bursts, and traffic bursts. Scanning may occur periodically at a given rate. As may be understood, the rate of scanning may be different depending upon what is being scanned. In some instances, the synchronization bursts, control bursts, and traffic bursts may be based on the signal of interest selected for the given band.

The transmit module 110 may cause the software defined radio 104 to scan the operational spectral bandwidth to determine an approximate number of interferers based on spectral occupancy. For example, where the number of interferers is 30, then 30 of the 64 channels are occupied by interferers. The number of interferers may then be used to calculate an interference-plus-noise ratio for each channel. In some instances, an interference-to-noise level and/or INR may also be calculated for a number of sub-bands (e.g., chunks, frequency bins, etc.), of the operational band. The sub-bands may each include a number of the channels, such that the sub-bandwidth is greater than the channel bandwidth and smaller than the operational bandwidth. The interference-to-noise level or INR may also be calculated for each channel of the sub-band. The transmitter may then select one or more channels of the sub-band based on an INR of the sub-band and/or an INR of the channel, thereby improving a likelihood of detection, as will be described further herein. The INR calculation may be performed before transmitting.

Consider a spectral band including a known bandwidth. The bandwidth may be divided into a number of channels based on the spectral bandwidth and the channel bandwidth. Any number of the channels may be occupied by interferers. For example, 75 percent of the channels may be occupied such that 25 percent of the channels are unoccupied. The transmit module 110 of the software defined radio 104 may cause the transmitter to select one of the unoccupied channels to put the signal of interest for communication with the receiver. The receive module 112 of the software defined radio 104 may cause the receiver to pick the channel where the transmitter placed the signal. The receiver does not know where the transmitter put the signal, such that the receiver may process each channel across the spectral band. The noise may be equivalent to the noise in the entire band and may contain all the interferers. In some instances, the noise plus interference across the entire band may be sufficiently high to cause the receiver to make a decision error. In embodiments, the transmitter increases the robustness of the signal (e.g., the number of symbols and/or the number of subcarriers) to accommodate for the INR at the receiver thereby establishing communication with the receiver. In embodiments, the transmitter and the receiver do not transmit in the entire band but only a portion of the band. For example, the spectral band may be split into a sub-band (also referred to herein as a chunk or frequency bin) including any number of the channels. The sub-band bandwidth may thus be smaller than the spectral bandwidth and larger than the channel bandwidth. The transmitter may determine the INR for each of the selected sub-bands. The INR for each sub-band may be smaller than the INR for the operational band. The smaller INR may translate to a different SINR for each sub-band at the receiver. Placing the signal in a sub-band with the lower INR may cause the receiver to receive the burst at a higher SINR, leading to better probability of detection. Furthermore, the impact of the interferers may be reduced on a sub-band by sub-band basis. Breaking the spectral band into the sub-bands may thus improve a reliability of detection for the signal of interest. In some instances, the sub-bands may be contiguous but may also be dis-contiguous. The logic of selecting the sub-band may be mission configurable and may vary over time, such that an interferer may have difficulty in determining the sub-bands, while the transmitter and the receiver may know the number and location of the sub-bands. The receiver may then select one or more of the sub-bands in which to scan for the signal of interest using the mission configuration.

The receive module 112 may cause the software defined radio 104 of the receiver node to scan the operational spectral bandwidth for determining whether an operational network exists between nodes 102. In particular, synchronization bursts across the spectral bandwidth may be looked for at appropriate times. If a synchronization burst is detected, the software defined radio 104 joins the network in progress and time syncs to the detected network. The receive module 112 may cause the software defined radio 104 of the receiver node to use a sparse detection algorithm, such as basis pursuit to detect the synchronization bursts placed in the available channels of the sub-band without prior knowledge of which channel the signal is being transmitted in.

The software defined radio 104 of the receiver node may look for the synchronization bursts based on an anticipated synchronization slot time when scanning for the synchronization bursts to determine if a network is operational. Where the software defined radio 104 is operating on localized time (e.g., without standardized time from a GPS), the software defined radio 104 may look for synchronization bursts within a time uncertainty window before and after anticipated slot time. For example, the node 102 may be currently operating on local time, which may exhibit inaccuracy causing the time uncertainty. Where the software defined radio 104 is operating on the GPS time, the node 102 may choose to ignore the uncertainty window to save on computations, although this is not intended as a limitation of the present disclosure. In embodiments, the software defined radio 104 may detect the synchronization bursts, or another component of the signal, based on various characteristics of the signal and one or more constraints.

In embodiments, the receive module 112 may cause the software defined radio 104 of the receiver node to pre-filer the spectral band using one or more known interferers from the spectral band prior to detecting the signal so that the average SINR at the receiver node is improved.

Once the software defined radio 104 has caused the receiver node(s) to join the network in progress, the receiver nodes may become time synchronized with the master transmitter node. In this regard, prior to initialization, the receiver nodes may be uncoordinated without time synchronization or frequency synchronization at initialization. The receiver nodes may then become time synchronized. As may be understood, the receiver nodes may not be frequency synchronized, even after detecting the signal and joining the network. Instead, the transmitter hops the signal between the channels without the receiver node knowing the hopped to frequency. The receiver node may scan the operational spectral bandwidth for synchronization bursts, control bursts and traffic bursts. In particular, the entire operational spectral bandwidth may then be scanned, without regard to a frequency table. Thus, synchronization bursts, control bursts, and traffic bursts in every slot or channel may be scanned. If all nodes of the network have some form of precise time (e.g., GPS), then the transmitter can arbitrarily select the channel to put the desired signal of interest without informing the receiver where the transmitter is putting the desired signal of interest. Since there is no coordination between the transmitter and receiver, the waveform may be designed with an appropriate level of coding/interleaving, automatic repeats, and relaying to address hidden node interference issues.

In embodiments, each of the synchronization burst, the traffic burst, and the control burst are constrained to one band. In the example above, a single band of operation is described for simplifying the explanation. Many software defined tactical radios like the ARC-210, True Net radios, and the like (of which the node 102 may include), can look at multiple chunks of spectrums in different bands simultaneously and there are many wideband SDRs that can look across 1 or more GHz of spectrum simultaneously. In embodiments, the opportunistic waveform described has a unique synchronization burst, control burst, and traffic burst spectral representations (A-Matrix) such that synchronization bursts may be exchanged in one band, control bursts in another band, and traffic bursts in yet another band, or some combination therein. Having unique spectral representations (A-Matrix) and unique occupancy representations (B-Matrix) enables for searching for each of the synchronization burst, control burst, and traffic burst spectral representations in parallel, which may increase a likelihood of detecting the network in progress. In embodiments, the waveform can be operated with common spectral representations for all three bursts (A-Matrix) and different occupancy representation (B-Matrix). The transmission scheme may thus be a single carrier scheme or a multicarrier scheme. The multicarrier scheme may include a contiguous (i.e., transmits in contiguous channels) or a dis-contiguous (i.e., distributed across channels which do not form a contiguous group). The multicarrier scheme may also include transmitting one or more of the control burst or the traffic burst outside of the spectral band in which the synchronization burst is transmitted. The synchronization, control, and traffic bursts can be of a same or different robustness. Where the synchronization, control, and traffic bursts include the same robustness an A-matrix may be the same, so additional information may be required to determine the type of burst. Similarly, the synchronization, control, and traffic bursts can have a different B-matrix. The different B-matrix may separate the burst occupancy according to sub-band, sub-carriers, symbols, time, and the like, thereby permitting the receiver to know when and where the bursts of each type are expected. In some instances, the B-matrix must be time synchronized to achieve detection of the traffic and control bursts. The receiver node may be time synchronized after receiving a given number of consecutive synchronization bursts.

Staring at wideband spectrum and searching for a desired signal(s) somewhere in the wideband spectrum of interest is a NP-hard combinatorial search problem. Since the desired signal(s) of interest occupy only a small fraction of the wideband spectrum of interest, the desired signal may be considered as a sparse signal. By considering the desired signal as a sparse signal, a sparse signal recovery algorithm may be used to find the desired signal(s). In embodiments, the receive module 112 may cause the software defined radio 104 of the receiver node to use a basis pursuit algorithm or an alternative minimization algorithm for sparse recovery or decoding the desired signal. The receiver may generally use a number of known algorithms for sparse recovery, such as, but not limited to basis pursuit (BP), alternative minimization, gradient descent, gradient projection for sparse recovery (GPSR), greedy, matching pursuit (MP), orthogonal matching pursuit (OMP), and the like.

The basis pursuit algorithm is an approximate combinatorial optimization technique. The purpose of the algorithm is to compute all possible locations of the signal of interest and then select the best probable location of the desired signal of interest. The Basis Pursuit algorithm is scalable even though its memory consumption is high. When implementing the basis pursuit algorithm, the matrix structure and sparsity pattern may be used to reduce the computation.

In an adversarial environment that is contested and congested, sparse signal processing algorithms like Basis Pursuit may experience difficulty in detecting the signal of interest. To improve the chances of reliable detection, the desired signal may be designed to operate in the band of interest based on the interference-plus-noise ratio of the channels. To operate in the band of interest, the transmit module 110 may cause the software defined radio 104 of the transmitter to compute the interference-plus-noise level for each channel of the band of interest and then dynamically on every burst select a desired signal structure capable of being reliably detected by the receivers (e.g., based on the number of interferers). In some instances, the receiver and the transmitter may operate in a sub-band of the operational band. The sub-band may include a preselected number of channels which is a priori known by the receiver and the transmitter. By splitting the band of interest into multiple sub-bands and computing the interference plus noise level of each channel in the sub-band, the transmitter may select channels within the sub-band that can be exploited reliably for placing the transmit signals in sub-bands with more favorable interference-plus-noise levels. It is contemplated that the transmitter may transmit in any channel across the band or only in channels within the sub-band. Transmitting in channels within the sub-band may improve a likelihood of the receiver detecting the signal of interest when in an operational environment including interferers, because the transmitter has an additional degree of freedom that the jammer does not have in placing interference.

The transmitter node may be configured to transmit one or more signals of interest in one or more channels of the operational spectral bandwidth. If the receiver node fails to find the any transmitted bursts (e.g., any of the synchronization burst, the control burst or the traffic burst), such that bursts are detected during the scanning, the software defined radio may become a synchronization master and instead transmit the synchronization bursts in response to failing to find the synchronization burst. Other nodes of the communication system 100 may then receive the synchronization bursts and establish the network. As may be understood, the software defined radio may function as both a transmitter and a receiver, such that any number of the steps described herein may be performed in various orders.

In some instances, proximity of high-intensity interferers may result in mis-detection of the desired signal. To address the mis-detection and achieve reliable detection, the transmit module 110 may cause the software defined radio 104 of the transmitter to increase the number of symbols in the desired signal to be matched to the INR of the band of interest. The number of symbols may be increased by changing the type of the waveform, decreasing the bit rate, or changing the type of the modulation scheme. This condition is described further herein in the exemplary results. Increasing the number of symbols in the desired signal to be matched to the INR of the band of interest to achieve reliable detection may provide a number of advantages. To perform the above, the transmitter may order the sub-bands based on the INR from low to high. The transmitter may then select one or more sub-bands for transmitting the signal based on mission needs. The transmitter may also select signal characteristics that can ensure reliable detection based on the INR of the selected sub-bands. Knowing the threat environment permits the transmitter radio to select the appropriate desired signal such that sparse signal recovery algorithms like Basis Pursuit can be employed to reliably detect the presence of frequency hopped sparse signals of interest that continually change. In this regard, each synchronization burst of the signal (or other burst) may be frequency hopped between any number of channels to avoid the interferers present in the channels. The transmitter selecting lower INR sub-bands may be equivalent to having a higher SINR at the receiver.

The receive module 112 may cause the software defined radio 104 of the receiver to find one or more sub-bands using the basis pursuit algorithm, and the like. Thus, the transmitter is continuously changing where it puts one or more signals based on mission needs, RF channel conditions, and maximum signal power that can be transmitted. The receiver may also have access to mission needs and can compute approximate RF channel conditions but not the exact channel conditions as seen by the transmitter. The receiver may find one or more probable solutions whose uncertainties has to be resolved to reliably detect the signal. Since each of the receivers may be at different distances from the transmitter, they will see a different SINR and different detection metric.

In embodiments, a library of desired pre-defined signals of interest are maintained (e.g., in memory 108) and the transmitter selects one of the signals to match the band of interest. The selected signal may then be considered a signal of interest. The receiver may then select one or more pre-defined signals of interest that closely matches the band of interest and test the library of pre-defined signal in parallel for detection purposes. In embodiments, the transmitter may have an imperfect picture of the RF environment. In the initial stages of the communication network, a robust signal will be used for network formation. Then as part of network maintenance, the proximity of high interferers will be exchanged between the network nodes at a low rate to aid the transmitter to select the optimal sub-band(s) and signal characteristics. In this regard, the synchronization signal may be more robust than either of the control signal or the traffic signal.

A likelihood of the detection may be increased by transmitting and/or scanning for multiple different signals of interest (e.g., synchronization bursts, control bursts, and traffic bursts) that move (e.g., both in frequency, time, and intensity). Thus, an interferer may experience difficulty in placing the interfering signals to ensure mis-detection of the desired signals. This coupled with the fact that the transmitter can listen and compute the noise environment so that it can place the desired signal of interest with optimal separation ensures that Basis Pursuit algorithm can be employed reliably in contested and congested environments.

In some instances, the interferers may be stationary or mobile. The radio terminals may also be mobile. At any communication instant a subset of the mobile terminals looks for the presence of one of the terminals to transmit at an arbitrary frequency that is not occupied by the interferers. The number of interferers and their intensity will be different at all receivers depending on the topology of the network. The opportunistic transmitter is also being received with different SINR at each receiver. In addition, the transmitting terminal keeps on periodically changing and the communication employs opportunistic frequency hopping at medium or high rates to deliver anti-jam capabilities. A combination of desired signal structures and proximity separation is also employed. Thus, the waveform has to ensure that all the terminals are synchronized in time so that nodes transmit at proper communication opportunities and reliable detection can be achieved for each time slot. This also enables orthogonal communications in parallel with appropriate time/frequency separation based on TRANSEC to reduce collisions.

Figure 3A:
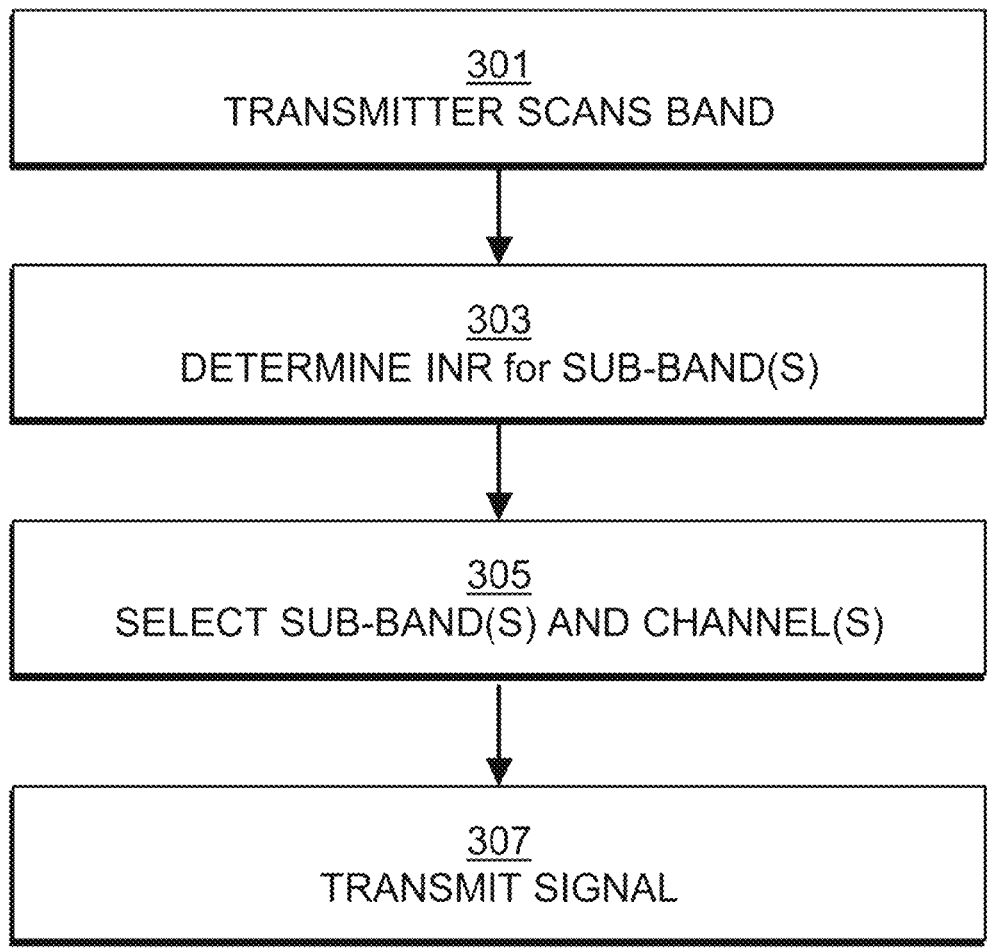
FIGS. 3A-3B depict a flow diagram of a method implementable by a software defined radio, in accordance with one or more embodiments of the present disclosure.
Figure 3B:
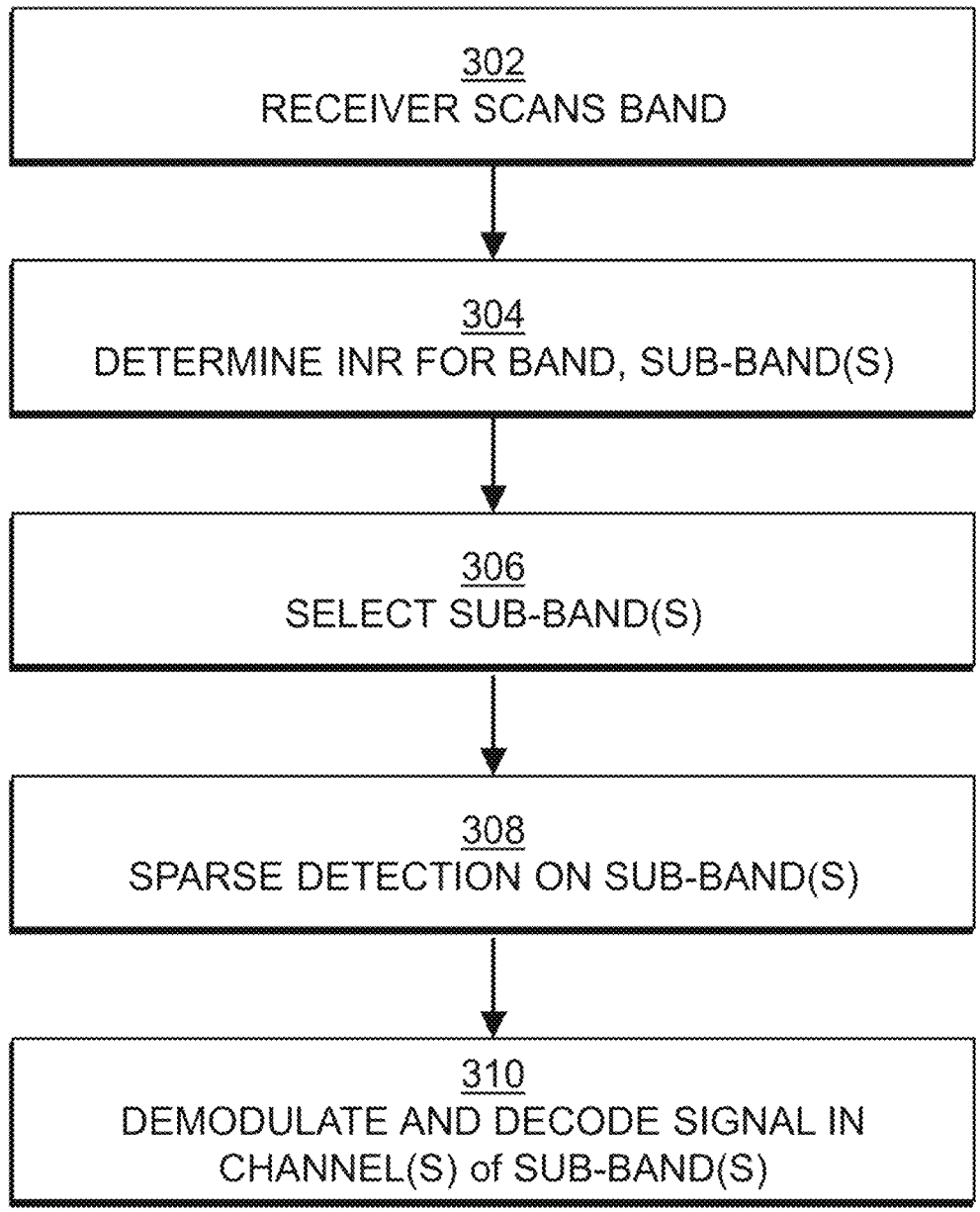
Figure 4A:
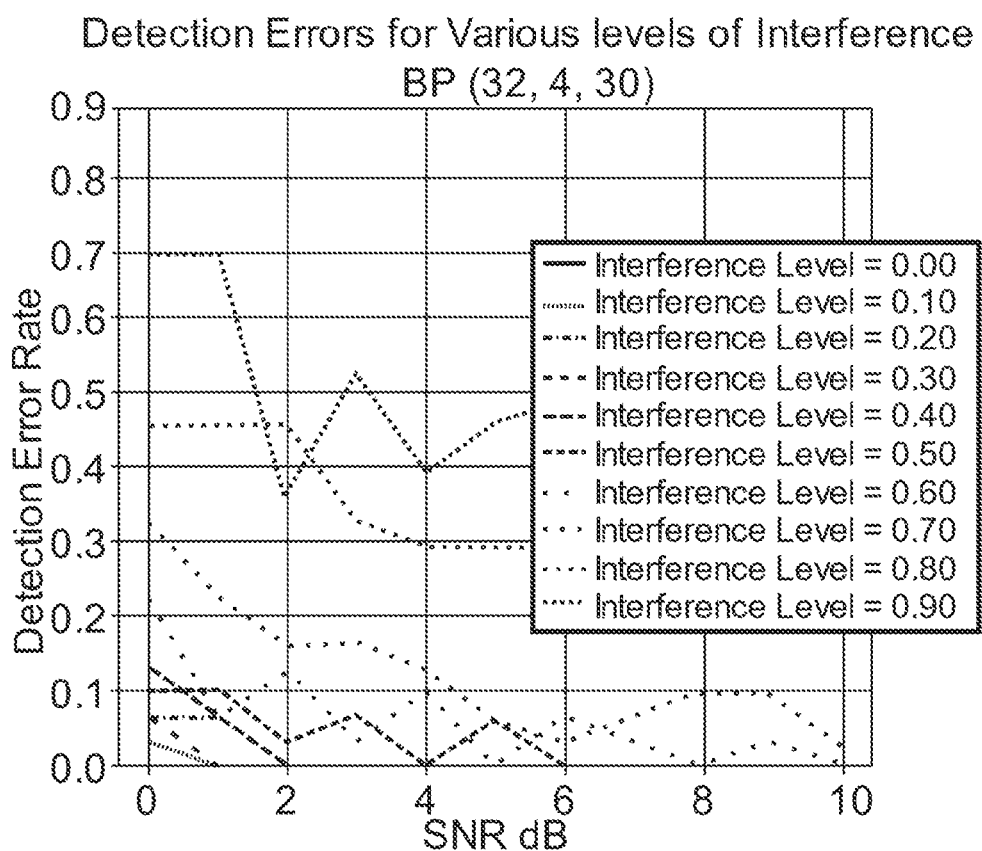
FIGS. 4A-4D depict plots of experimental results for detection error rate across a 200 kHz band with a given interferer level and signal-to-noise value as the number of symbols of the signal is varied, in accordance with one or more embodiments of the present disclosure.
Figure 4B:
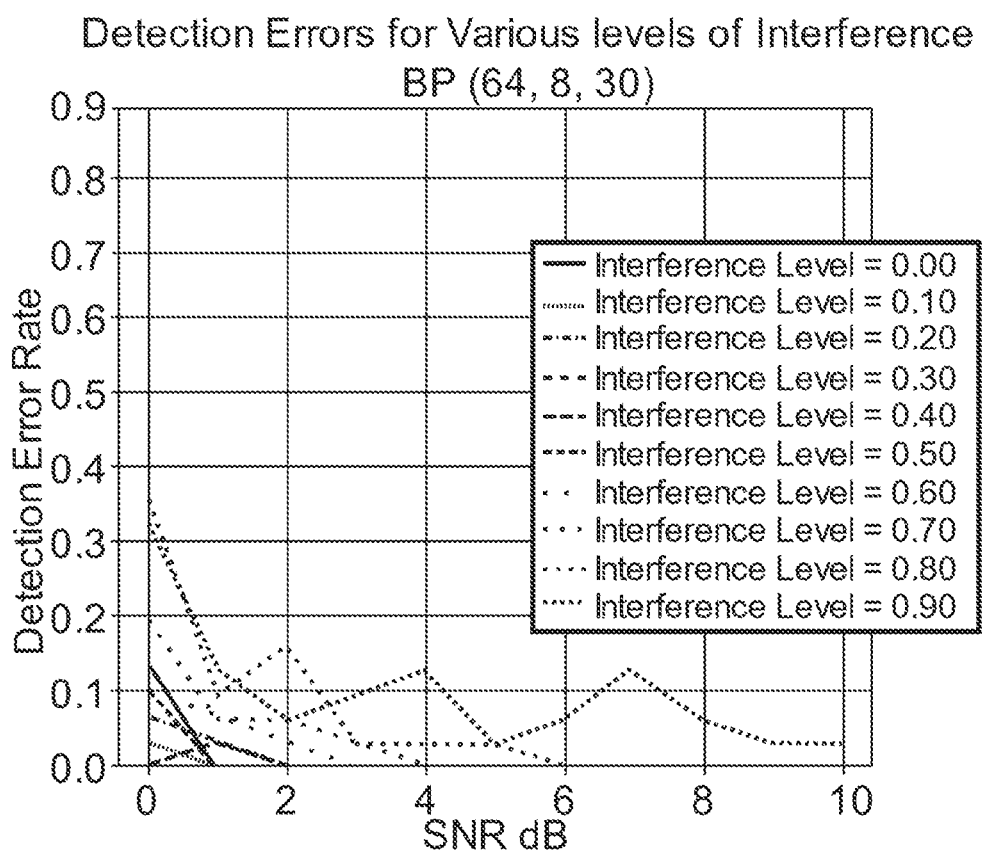
Figure 4C:
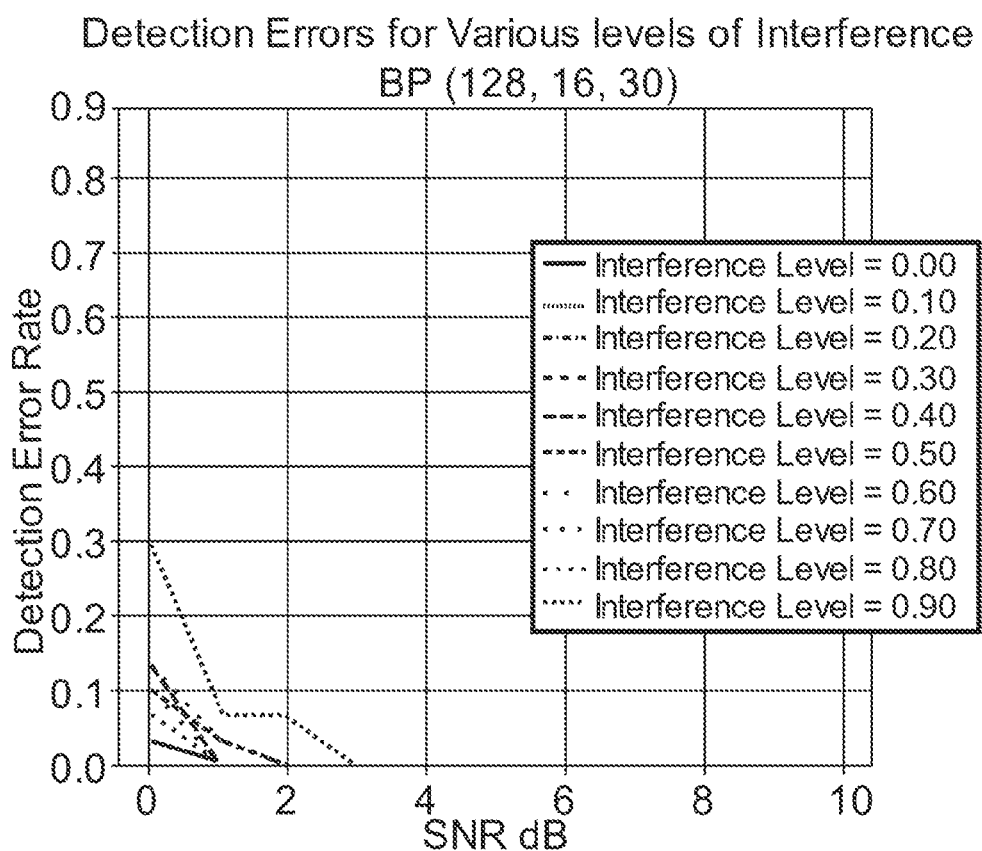
Figure 4D:
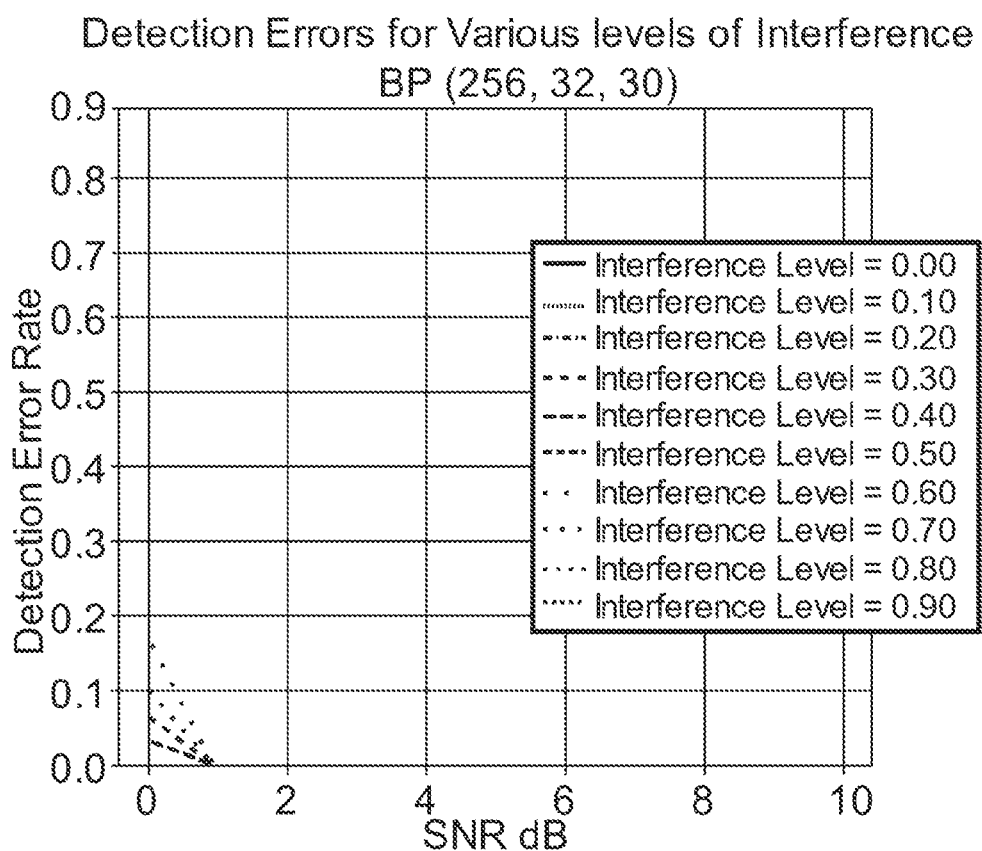

Referring generally to FIGS. 3A-3B, a method 300 is described in accordance with one or more embodiments of the present disclosure. The embodiments and the enabling technology described previously herein in the context of the communication system 100 and the node 102 should be interpreted to extend to the method 300. It is further contemplated that the method 300 is not limited to the communication system 100 or the node 102.

Referring now to FIG. 3A, a flow diagram performed by a transmitter node is described. In a step 301, the transmitter node scans the operational band. In a step 303, the transmitter node determines an interference plus noise ratio (INR) for one or more portions of the operational band, such as across the operational band, sub-bands of the operational band, and one or more channels of the sub-bands. In a step 305, the transmitter node selects a sub-band and one or more channels of the sub-band in which to transmit a signal. The transmitter may select the sub-band and the one or more channels based on any number of factors, such as, but not limited to, mission criteria, and/or the determined INR. The transmitter may also select a waveform suitable for the selected sub-band and channel. The waveform may be selected where the waveform includes a sufficient reliability of detection according to an expected SINR at the receiver and a preconfigured detection error rate stored in memory. In a step 307, the transmitter node transmits a signal with a given power to achieve a SINR suitable for reception by the receiver at or below the preconfigured error detection rate. The transmitter may transmit the signal in a number of bursts which are hopped between one or more channels of the sub-band, and optionally between multiple sub-bands, to avoid the interferers. The bursts may include synchronization bursts for time synchronizing the transmitter node and the receiver node. The burst may also include control bursts and traffic bursts.

Referring now to FIG. 3B, a flow diagram performed by a receiver node is described. In a step 302, the receiver node scans the operational band. By scanning the operational band, the receiver may receive the sub-bands of the operational band without knowing which of the sub-bands and which of the channels include the signal of interest. In a step 304, the receiver node determines an interference plus noise ratio (INR) for one or more of the entire operational band or one or more sub-bands. In a step 306, the receiver node selects one or more of the sub-bands in which the transmitter node was likely to put the signal of interest. The receiver node may select the sub-band by ordering the sub-bands according to a preconfigured mission characteristic, such as by the determined INR values. In a step 308, the receiver node performs a sparse detection algorithm on the one or more sub-bands to detect the signal of interest in the one or more channels. The receiver node may order the sub-bands and perform the sparse detection algorithm on the sub-bands starting from the sub-band with the lowest INR value, although this is not intended to be limiting. In some instances, the sparse detection algorithm is a basis pursuit algorithm, although this is not intended to be limiting. In a step 310, the receiver node demodulates and decodes the one or more channels in which the signal of interest is transmitted. As may be understood, the receiver node may demodulate and decode the signal of interest using any demodulation scheme and any decoding scheme known in the art. In some instances, the decoding scheme may be a proprietary and confidential decoding scheme.

The receiver node may receive the signal by performing the steps 302, 304, 306, 308, and 310 after the transmitter node transmits the signal. In some instances, the steps 301 through 310 are initially used to transmit and receive synchronization bursts between the transmitter node and the receiver node for time synch. Subsequent to synchronization, the transmitter node and the receiver node may repeat the method 300 to transmit and receive synchronization bursts, control bursts, and traffic bursts while avoiding enemy interferers.

Referring generally to FIG. 4A-D, a number of simulation results are described. The simulation results indicate a signal estimate 404 for a signal of interest 402. To ensure the results are depicted in a consistent manner, there parameters are defined: Signal to Noise Ratio (SNR) in the channel of interest, Number of Interferers, and Intensity level of the interferers. The simulation sets the noise plus interference in the bins in a manner to ensure that number of interferers, intensity level of the interferers, and desired signal SNR is balanced in a consistent manner. The number of interferers dictates how many potential places the transmitter can place the signal of interest. Interference levels refers to energy content of the interferers plus AWGN noise in a high SNR domain. The level of the interferer is based on the intensity level of the interferer, permitting sizing the interference level with respect to the signal level. As may be understood, during operation in an environment the signal level may instead be sized with respect to the noise and the interference level. The results are classified as follows: reliable detection as 0 detection errors, occasional errors as less than or equal to 10 percent detection errors and high errors as greater than or equal to 25 percent detection errors.

The desired signal of interest may include a sequence of symbols. The symbols may be transmitted in the time domain or in the frequency domain. The radio may thus support single carrier as well as multi-carrier waveforms. For ease in visual display, the various examples depicted are showcased in the frequency domain. The desired signal may occupy consecutive symbols, though the implementation does not preclude the desired signal from being spread in both the frequency and time domain without the necessity of being contiguous. The receiver does not know where the actual signal of interest lies but only knows that the signal of interest occupies contiguous symbols and its fast Fourier transform (FFT)-based spectral representation. The receiver uses the Basis Pursuit (BP) Algorithm and estimates the signal location. The Basis Pursuit algorithm is demonstrated to create an opportunistic communication waveform that can operate in contested and congested tactical environments.

TABLE 1

| | | | | |
|---|---|---|---|---|
| 25 kHz Channels (in 200 kHz band) | 8 | 8 | 8 | 8 |
| Signal Symbols | 4 | 8 | 16 | 32 |
| Total Symbols (in 200 kHz band) | 32 | 64 | 128 | 256 |
| Number of Interferers (at 75% Occupancy) | 6 | 6 | 6 | 6 |
| Interference Level | 0.9 | 0.9 | 0.9 | 0.9 |
| Desired Signal SNR (db) | 0 | 0 | 0 | 0 |
| Runs | 1000 | 1000 | 1000 | 1000 |
| Number of Detection Errors | 572 | 303 | 148 | 102 |
| Error Rate | 57% | 30% | 15% | 10% |

Referring now to Table 1, a reduction of mis-detection rate with increasing symbol energy is described. The Basis Pursuit algorithm is a combinatorial optimization algorithm so increasing the number of desired signal symbols may improve the detection performance as it adds more energy for detection. The effect of increasing the number of symbols of the desired signal are illustrated in Table 1. The mis-detection rate may be reduced by manipulating the signal of interest (i.e., adding more symbols to improve signal energy and detail). Ensuring the availability of more than 32 symbols reduces the mis-detection rate from high errors to occasional error. In this regard, the Basis Pursuit algorithm may be suitable for use in contested and congested environments where up to 75 percent of the available spectrum can be occupied by other signals (friendly and/or enemy). The radios may thus operate in a low SNR domain with high levels of interference. Thus, matching the desired signal to the SINR of the band of interest may be relatively impactful in improving the detection error rate.

Referring generally to FIGS. 5A-5F. Described further herein are simulation results where the level of interferers is kept at 75 percent occupancy to represent a contested and congested operational environment, the interference levels are kept at 0.5, the symbols are kept at 32 symbols of the signal, and the SNR is kept at 2 dB. The variable is the total number of channels. By increasing the number of channels, a scalability for the basis pursuit algorithm may be determined across a given bandwidth (e.g., for a given sub-band of the operational band). As demonstrated, reliable detection can be achieved as long as the number of interferers occupy less than 75 percent of the band of interest.

Figure 5A:
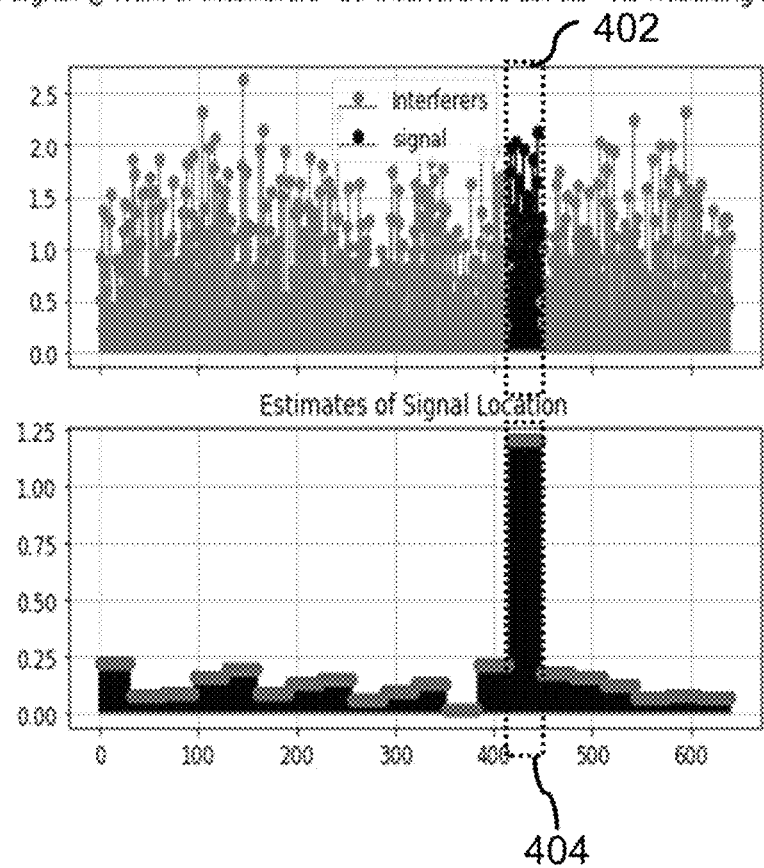
FIGS. 5A-5F depict plots of experimental results for detecting a signal without a priori knowledge of a transmission channel for the signal with a given interferer level and signal-to-noise value with the signal including 32 symbols as the band and the number of channels is varied, in accordance with one or more embodiments of the present disclosure.

FIG. 5A depicts reliable opportunistic communication with 20 channels, 15 interferers with an interference level of 0.5, 32 symbols, 2 dB SNR.

Figure 5B:
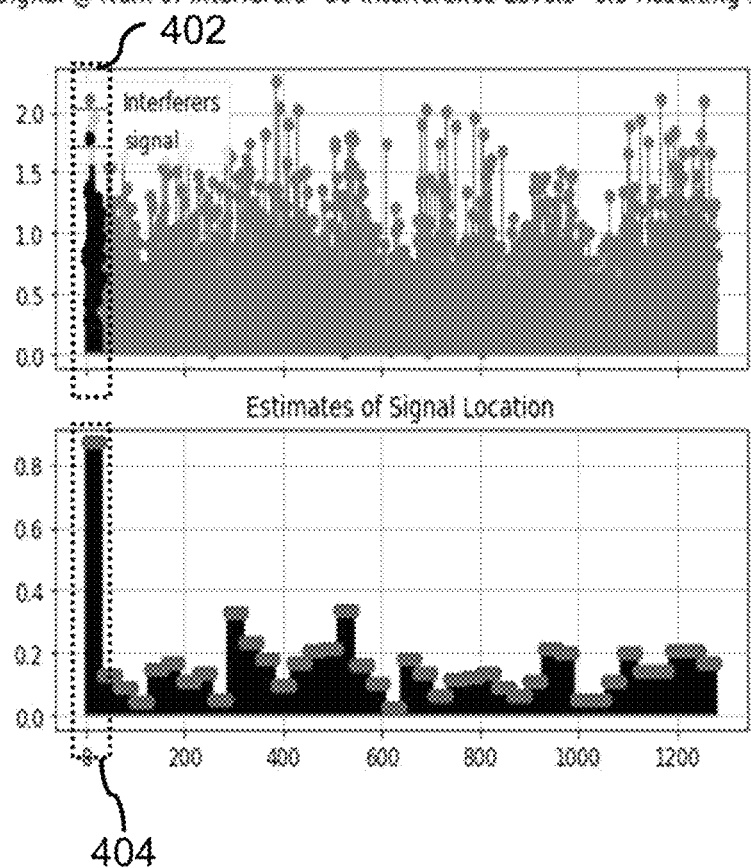

FIG. 5B depicts reliable opportunistic communication with 40 channels, 30 interferers with an interference level of 0.5, 32 symbols, 2 dB SNR.

Figure 5C:
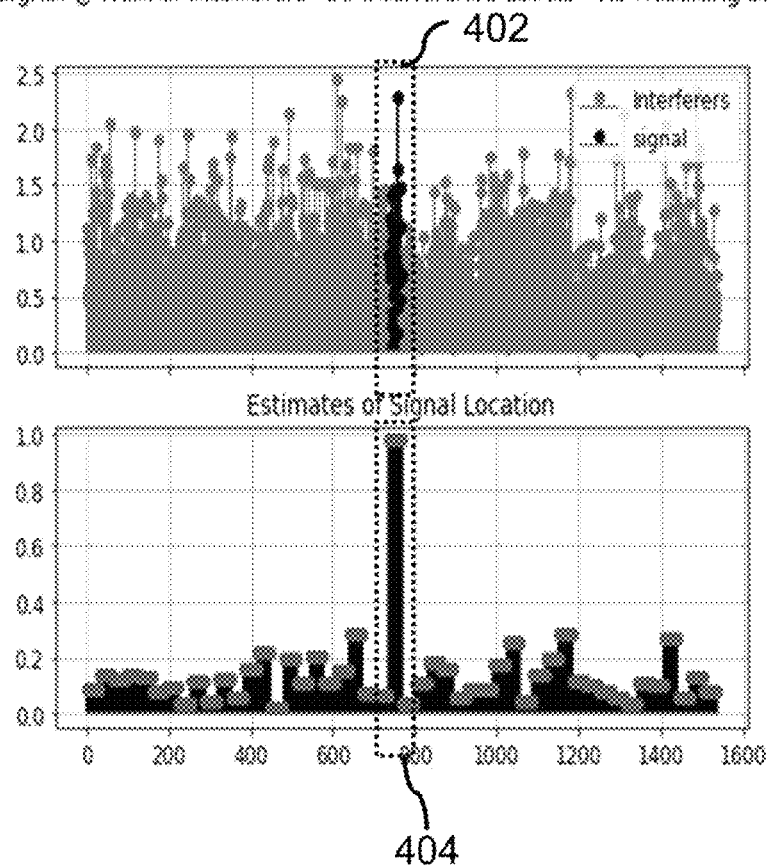

FIG. 5C depicts reliable opportunistic communication with 48 channels, 36 interferers with an interference level of 0.5, 32 symbols, 2 dB SNR.

Figure 5D:
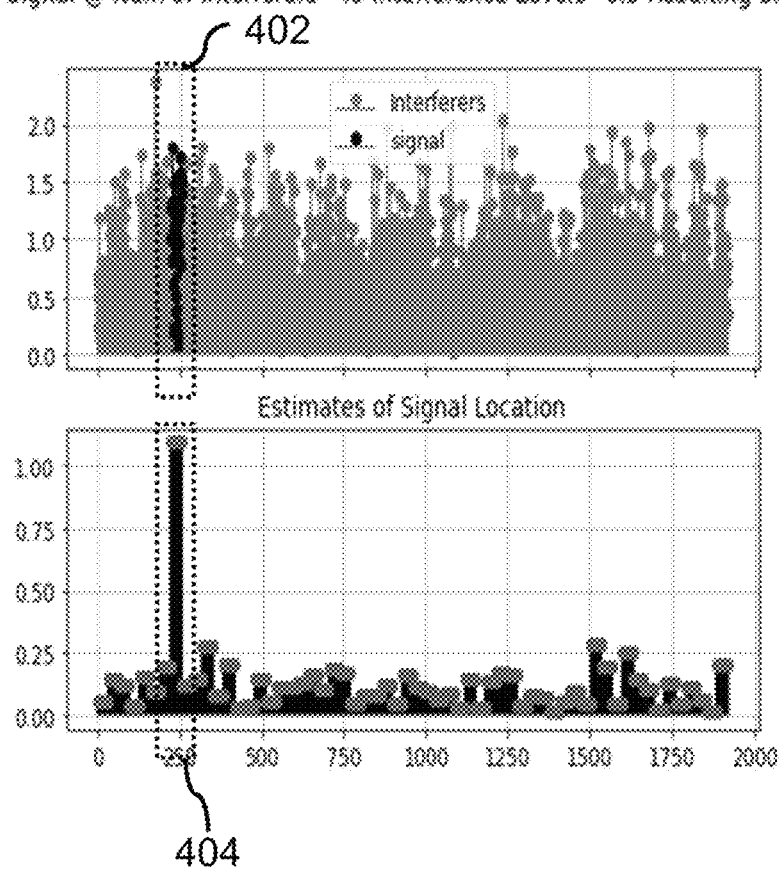

FIG. 5D depicts reliable opportunistic communication with 60 channels, 45 interferers with an interference level of 0.5, 32 symbols, 2 dB SNR.

Figure 5E:
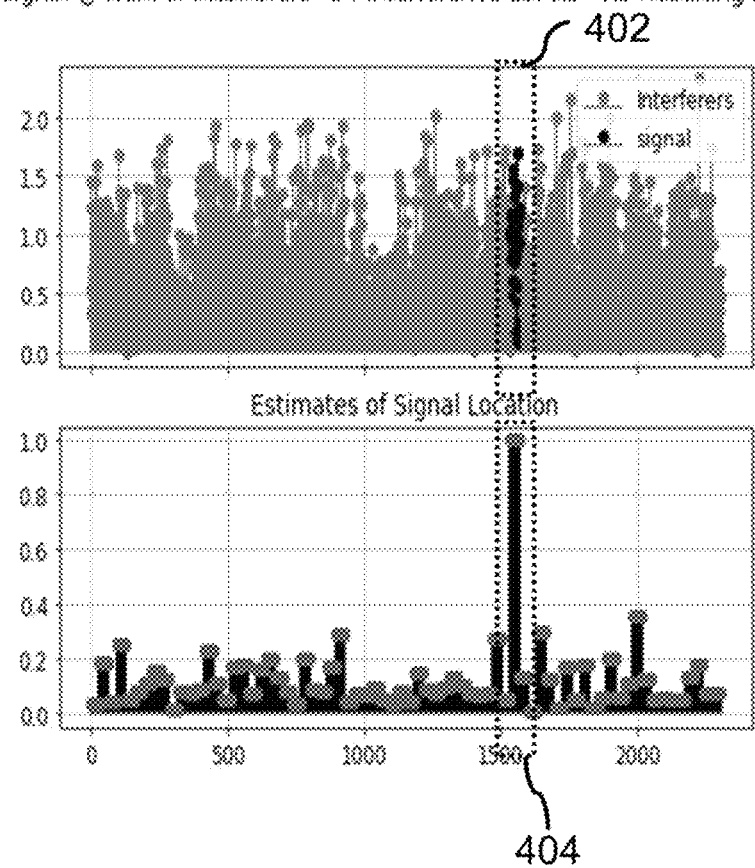

FIG. 5E depicts reliable opportunistic communication with 72 channels, 54 interferers with an interference level of 0.5, 32 symbols, 2 dB SNR.

Figure 5F:
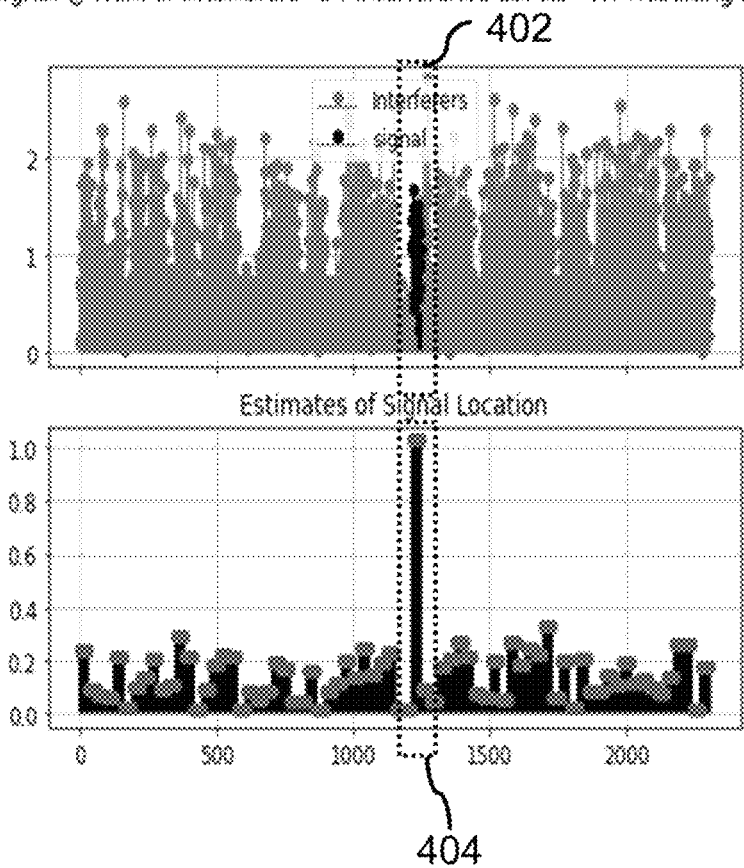

FIG. 5F depicts reliable opportunistic communication similar to FIG. 5E (e.g., 72 channels, 54 interferers, 32 symbols, 2 dB SNR) with an increased level of the interference from 0.5 to 0.7.

The radio may detect the signal with higher levels of interference, up to 0.9 or more, by increasing a robustness (e.g., number of symbols and/or number of subcarriers) of the signal.

All the simulations were done with random selection of location for placing the desired signal so that worst case detection performance is obtained.

Referring generally again to FIGS. 1-5F, for the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). Furthermore, the memory may include any storage medium known in the art suitable for storing program instructions executable by the associated processor. For example, the memory medium may include a non-transitory memory medium. By way of another example, the memory medium may include, but is not limited to, a read-only memory (ROM), a random-access memory (RAM), a magnetic or optical memory device (e.g., disk), a solid-state drive and the like. It is further noted that memory medium may be housed in a common controller housing with the processor. In embodiments, the memory medium may be located remotely with respect to the physical location of the processor.

Although much of the present disclosure is contemplated in the tactical networking space, this is not intended as a limitation of the present disclosure. The node 102 may generally be included in any suitable platform, such as a vehicle (e.g., an aircraft, a watercraft, a submersible craft, an automobile, a spacecraft, a satellite, and/or a train) or a man pack. Thus, the node 102 may be included in a mobile platform.

Although much of the present disclosure is contemplated as providing the nodes 102 which is configured to initializing the network as a slave node (e.g., by detecting the synchronization signal) and upon failing to detect the synchronization signal to become a master node thereby transmitting the synchronization signal, this is not intended as a limitation of the present disclosure. In this regard, the node 102 may include any one of transmitter node which may transmit the signals or a receiver node which may receive signals. Furthermore, the node may or may not include a capability to become a synchronization master node.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A software defined radio comprising:
a non-transitory memory maintaining program instructions; and
one or more processors configured to execute the program instructions maintained on the memory causing the one or more processors to:
scan an operational band including a plurality of channels to determine an interference-plus-noise ratio for each of the plurality of channels based on one or more interferers in the plurality of channels;
transmit, without frequency synchronization to a frequency table, a signal in at least one channel while frequency hopping the at least one channel between the plurality of channels to avoid the one or more interferers;
receive one or more sub-bands of the operational band, at least one of the one or more sub-bands including the signal, the one or more sub-bands each including a bandwidth greater than a channel bandwidth; and
detect the signal by scanning each channel of the one or more sub-bands of the operational band using a sparse detection algorithm with one or more constraints and without a priori knowledge of the at least one channel in which the signal is transmitted; wherein the one or more constraints include the channel bandwidth and a robustness of the signal.

2. The software defined radio of claim 1, wherein the non-transitory memory further includes a constraint matrix and at least one burst matrix; wherein a size of the constraint matrix and a size of the at least one burst matrix is based on the channel bandwidth and the robustness of the signal; wherein the one or more processors detect the signal using the constraint matrix and the at least one burst matrix.

3. The software defined radio of claim 2, wherein the signal includes a synchronization burst; wherein the at least one burst matrix includes a synchronization burst matrix; wherein the synchronization burst matrix is a fast-Fourier transform of the synchronization burst; wherein the one or more processors detect the signal using the constraint matrix and the synchronization burst matrix.

4. The software defined radio of claim 3, wherein the synchronization burst is one of a plurality of synchronization bursts transmitted by the software defined radio; wherein the one or more processors frequency hop between the plurality of channels to dynamically avoid the one or more interferers for each of the plurality of synchronization bursts when transmitting in a single-carrier mode; wherein the one or more processors place the plurality of synchronization bursts across at least two of the plurality of channels when transmitting in a multi-carrier mode.

5. The software defined radio of claim 3, wherein the signal further includes a control burst and a traffic burst; wherein the at least one burst matrix further includes a control burst matrix, and a traffic burst matrix.

6. The software defined radio of claim 5, wherein the synchronization burst, the control burst, and the traffic burst are each transmitted in one frequency band selected from a very high frequency (VHF) band, an ultra high frequency (UHF) band, an L-band, an S-band, or a C-band.

7. The radio of claim 6, wherein the synchronization burst, the control burst, and the traffic burst are each transmitted in dis-contiguous channels.

8. The software defined radio of claim 5, wherein the synchronization burst, the control burst, and the traffic burst are each transmitted in a separate frequency band selected from a very high frequency (VHF) band, an ultra high frequency (UHF) band, an L-band, an S-band, or a C-band.

9. The software defined radio of claim 5, wherein the operational band includes at least two frequency bands selected from a very high frequency (VHF) band, an ultra high frequency (UHF) band, an L-band, an S-band, or a C-band; wherein at least a portion of the synchronization burst is transmitted in the at least two frequency bands.

10. The radio of claim 5, wherein the synchronization burst is transmitted in the operational band, wherein at least one of the control burst or the traffic burst is transmitted in any of one or more frequency bands.

11. The software defined radio of claim 1, wherein the radio is configured to increase the robustness for the signal based on at least one of an interference-plus-noise ratio, or a number of the one or more interferers in the plurality of channels.

12. The software defined radio of claim 1, wherein the sparse detection algorithm is a basis-pursuit algorithm.

13. The software defined radio of claim 1, wherein the one or more processors are further configured to scan for a synchronization burst of an operational network across the operational band; wherein the one or more processors transmit the signal in response to failing to find the synchronization burst, wherein the signal may establish the software defined radio as a synchronization master.

14. The software defined radio of claim 1, wherein the one or more processors are further configured to scan for a synchronization burst of an operational network across the operational band, detect the synchronization burst, and join the operational network for transmitting and receiving control bursts and traffic bursts by the operational network.

15. The software defined radio of claim 1, wherein the signal is selected based on the operational band and the interference-plus-noise ratio.

16. The software defined radio of claim 1, wherein the software defined radio is configured for single-carrier modulation; wherein the constraints are indicative of a signal characteristic of the signal including a number of symbols, a phase for each of the symbols, and a power for each of the symbols.

17. The software defined radio of claim 1, wherein the software defined radio is configured for multi-carrier modulation; wherein the signal is transmitted in at least two channels of the plurality of channels; wherein the constraints are indicative of a signal characteristic of the signal including a number of subcarriers, a phase for each of the subcarriers, a power for each of the subcarriers, and a relative placement for each of the subcarriers in the at least two channels; wherein the at least two channels are one of contiguous or dis-contiguous.

18. The software defined radio of claim 17, wherein the signal characteristics further include a time spreading for each of the subcarriers.

19. A communication system comprising:
a plurality of nodes including:
at least one transmitter node including a first software defined radio configured to:
scan an operational band including a plurality of channels to determine an interference-plus-noise ratio for each of the plurality of channels based on one or more interferers in the plurality of channels; and
transmit, without frequency synchronization to a frequency table, a signal in at least one channel while frequency hopping the at least one channel between the plurality of channels to avoid the one or more interferers; and
at least one receiver node including a second software defined radio configured to:
receive one or more sub-bands of the operational band, at least one of the one or more sub-bands including the signal, the one or more sub-bands including a bandwidth greater than a channel bandwidth; and
detect the signal by scanning each channel of the one or more sub-bands using a sparse detection algorithm with one or more constraints and without a priori knowledge of the at least one channel in which the signal is transmitted; wherein the one or more constraints include the channel bandwidth and a number of symbols of the signal;
wherein the at least one transmitter node and the at least one receiver node are uncoordinated without time synchronization or frequency synchronization at initialization; wherein the at least one receiver node becomes time synchronized with the at least one transmitter node upon detecting the signal; wherein the at least one receiver node is not frequency synchronized with the at least one transmitter node after detecting the signal.

20. A method comprising:
scanning an operational band including a plurality of channels to determine an interference-plus-noise ratio for each of the plurality of channels based on one or more interferers in the plurality of channels by at least one transmitter node;
transmitting, without frequency synchronization to a frequency table, a signal in at least one channel while frequency hopping the at least one channel between the plurality of channels to avoid the one or more interferers by the at least one transmitter node;
receiving one or more sub-bands of the operational band by at least one receiver node, wherein at least one of the one or more sub-bands including the signal, the one or more sub-bands each including a bandwidth greater than a channel bandwidth; and
detecting, by the at least one receiver node, the signal by scanning each channel of the one or more sub-bands of the operational band using a sparse detection algorithm with one or more constraints and without a priori knowledge of the at least one channel in which the signal is transmitted; wherein the one or more constraints include the channel bandwidth and a number of symbols of the signal.

* * * * *